United States Patent
Qi et al.

(10) Patent No.: US 9,474,094 B2
(45) Date of Patent: Oct. 18, 2016

(54) METHODS AND ARRANGEMENTS TO ESTABLISH PEER-TO-PEER LINK

(71) Applicant: Intel Corporation, Santa Clara, CA (US)

(72) Inventors: Emily H. Qi, Gig Harbor, WA (US); David J. McCall, Dallas, TX (US)

(73) Assignee: Intel Corporation, Santa Clara, CA (US)

(*) Notice: Subject to any disclaimer, the term of this patent is extended or adjusted under 35 U.S.C. 154(b) by 135 days.

(21) Appl. No.: 13/730,873

(22) Filed: Dec. 29, 2012

(65) Prior Publication Data

US 2014/0045422 A1    Feb. 13, 2014

Related U.S. Application Data

(60) Provisional application No. 61/680,695, filed on Aug. 7, 2012.

(51) Int. Cl.
H04W 76/02    (2009.01)

(52) U.S. Cl.
CPC ................................. *H04W 76/023* (2013.01)

(58) Field of Classification Search
CPC ..... H04W 4/08; H04W 8/186; H04W 48/08; H04W 76/16; H04W 76/023; H04W 84/10; H04W 4/00; H04W 8/005; H04B 7/00; H04B 15/00; H04J 3/24; H04J 3/16; H04J 3/22; G06F 15/16; H04L 12/2809; H04L 67/16; H04L 67/04; H04L 67/12; H04L 63/102
USPC ......... 455/39, 41.1, 41.2, 422.1, 456.1, 458, 455/461, 466; 370/328, 329, 350, 352, 458, 370/252, 255
See application file for complete search history.

(56) References Cited

U.S. PATENT DOCUMENTS

| | | | |
|---|---|---|---|
| 8,170,481 B2 | 5/2012 | Rangarajan et al. | |
| 8,346,169 B2 * | 1/2013 | Mauney et al. | ............. 455/41.2 |
| 8,526,977 B2 * | 9/2013 | Pearson et al. | ............ 455/456.1 |
| 8,570,950 B2 * | 10/2013 | Kosaka | ......................... 370/328 |

(Continued)

FOREIGN PATENT DOCUMENTS

| | | |
|---|---|---|
| WO | 2012088470 A1 | 6/2012 |
| WO | 2014/025475 A1 | 2/2014 |

OTHER PUBLICATIONS

International Preliminary Report on Patentability and Written Opinion received for PCT Patent Application No. PCT/US2013/048813, mailed on Feb. 19, 2015, 10 pages. International Search Report and Written Opinion received for PCT Patent Application No. PCT/US2013/048813, mailed on Oct. 18, 2013, 14 pages.

*Primary Examiner* — Thanh Le
(74) *Attorney, Agent, or Firm* — Schubert Law Group PLLC

(57) ABSTRACT

Logic may enable a number of Wireless Fidelity (Wi-Fi) enabled mobile devices to establish Peer-to-Peer connectivity to allow users to connect their devices in an easy and convenient manner to share, show, print, and synchronize content. Logic may enable interoperability between services/applications from multiple vendors. Users may experience consistency due to services interoperability. Logic provide a procedure to enable multiple vendor's applications and services interoperability via methods and arrangements to enable Peer-to-Peer (P2P) connection limited to allow traffic from user-invoked services on, e.g., a Wi-Fi Direct connection.

29 Claims, 7 Drawing Sheets

(56) References Cited

U.S. PATENT DOCUMENTS

| | | | |
|---|---|---|---|
| 8,688,152 B2* | 4/2014 | Lazaridis et al. | 455/466 |
| 8,706,145 B2* | 4/2014 | Li et al. | 455/458 |
| 2002/0112058 A1 | 8/2002 | Weisman et al. | |
| 2002/0184310 A1 | 12/2002 | Traversat et al. | |
| 2007/0162583 A1 | 7/2007 | Takahashi et al. | |
| 2009/0239469 A1* | 9/2009 | Rangarajan | H04L 67/16 455/41.2 |
| 2011/0051733 A1 | 3/2011 | Hirata | |
| 2011/0082940 A1 | 4/2011 | Montemurro et al. | |
| 2011/0149806 A1 | 6/2011 | Verma et al. | |
| 2012/0134349 A1 | 5/2012 | Jung et al. | |
| 2012/0208461 A1* | 8/2012 | Choi et al. | 455/41.2 |
| 2013/0034023 A1* | 2/2013 | Jung | 370/255 |
| 2015/0271657 A1* | 9/2015 | Xiong | H04W 8/005 370/329 |
| 2015/0296416 A1* | 10/2015 | Lee | H04W 76/023 370/331 |
| 2016/0113049 A1* | 4/2016 | Kim | H04W 76/023 455/41.2 |

OTHER PUBLICATIONS

Extended Search Report received for European Patent Application No. 13827722.3, mailed Feb. 25, 2016, 9 pages.

Wi-Fi Alliance: "Wi-Fi Peer-to-Peer (P2P) Technical Specification v1.1", Wi-Fl Alliance Specification, Jan. 1, 2010, Doc. No. XP009163866, 159 pages.

* cited by examiner

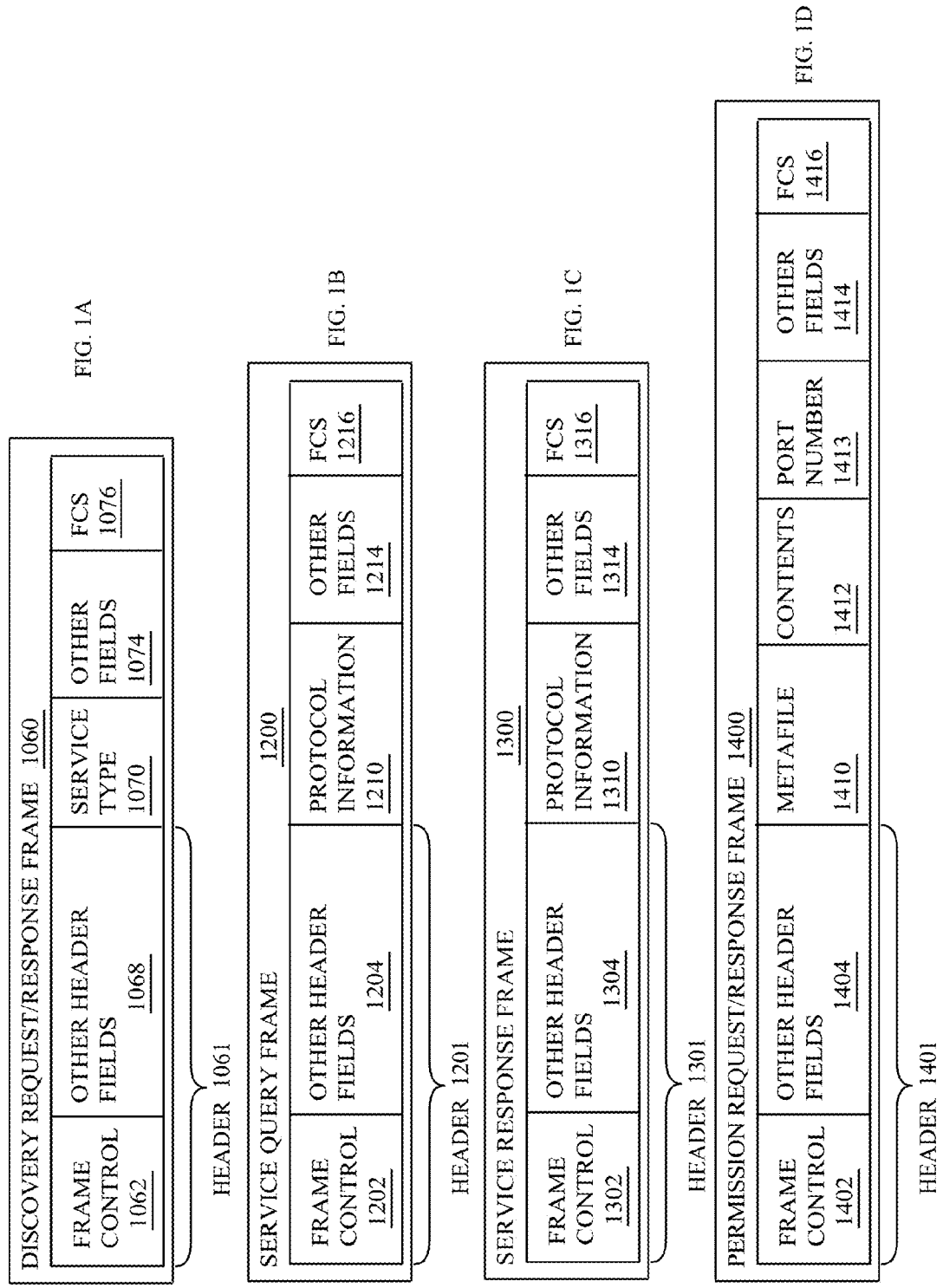

FIG. 1F

TABLE 1

| RECEIVER / SENDER | P2P DEVICE | P2P GO | P2P CLIENT |
|---|---|---|---|
| P2P DEVICE | START A NEW GROUP - GO NEGOTIATION | INVITE TO JOIN THE EXISTING GROUP - P2P INVITATION | INVITE ANOTHER DEVICE TO JOIN THE EXISTING GROUP – P2P INVITATION OR<br>1. DIS-ASSOCIATION TO EXISTING GO<br>2. START A NEW GROUP |
| P2P GO | INVITE TO JOIN THE EXISTING GROUP - P2P INVITATION | INVITE TO JOIN THE EXISTING GROUP - P2P INVITATION | INVITE TO JOIN THE EXISTING GROUP - P2P INVITATION |
| P2P CLIENT | 1. INVITE ANOTHER DEVICE TO JOIN THE EXISTING GROUP – P2P INVITATION OR<br>1. DIS-ASSOCIATION TO EXISTING GO<br>2. START A NEW GROUP | INVITE TO JOIN THE EXISTING GROUP - P2P INVITATION | INVITE ANOTHER DEVICE TO JOIN THE EXISTING GROUP – P2P INVITATION OR<br>1. DIS-ASSOCIATION TO EXISTING GOS<br>2. START A NEW GROUP |

METHODS AND ARRANGEMENTS TO ESTABLISH PEER-TO-PEER LINK

BACKGROUND

Embodiments are in the field of wireless communications. More particularly, embodiments are in the field of communications protocols between wireless transmitters and receivers.

BRIEF DESCRIPTION OF THE DRAWINGS

FIGS. 1A-D depict embodiments of Device Discovery frames, Service Query and Response frames and Permission Request and Response frames for communications between wireless communication devices;

FIG. 1F depicts embodiments of methods of initiating a P2P connection in the form of a TABLE 1;

DETAILED DESCRIPTION OF EMBODIMENTS

Figure 1:
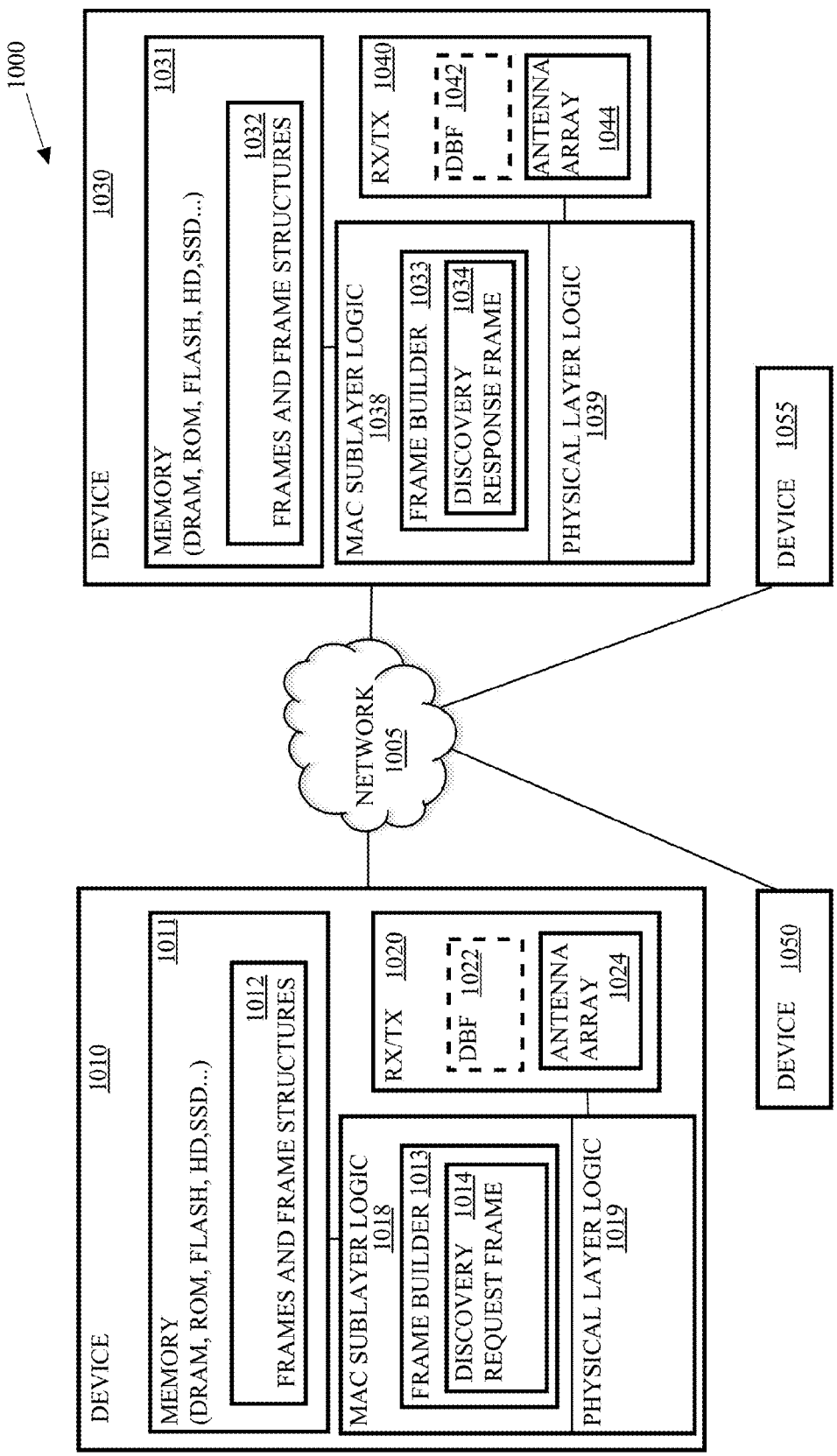
FIG. 1 depicts an embodiment of a wireless network comprising a plurality of communications devices, including multiple fixed or mobile communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Embodiments may enable a number of Wireless Fidelity (Wi-Fi) enabled mobile devices to establish Peer-to-Peer connectivity to allow users to connect their devices in an easy and convenient manner to, e.g., share, show, print, and synchronize content. Some embodiments may provide or enable interoperability between services/applications from multiple vendors. Users may experience consistency due to services interoperability. Many embodiments provide a procedure to enable multiple vendor's applications and services interoperability via methods and arrangements to enable Peer-to-Peer (P2P) connection limited to allow traffic from user-invoked services on, e.g., a Wi-Fi Direct connection.

Many embodiments proceed through a number of phases to enable the establishment of a P2P connection such as a device discovery phase, a service discovery phase, a permission phase, a P2P initiation phase if necessary, a P2P connection phase, and a service performance phase. Several embodiments involve a communication of a device discovery frame such as a probe frame or a beacon frame during the device discovery phase from a first device attempting to find a second device or multiple receiving devices that support a selected service type. In some embodiments, the selected service type may be selected by a user of the first device and may comprise, e.g., a file transfer such as a photo transfer. The second device or receiving devices may respond to the device discovery frame indicating the capability to support the selected service type.

In some embodiments, the two devices may communicate service discovery frames such as service query and service response frames during a service discovery phase. For instance, the first device may transmit a service query frame to the receiving device and the second device or receiving devices may transmit service response frame(s) to the first device to indicate supported service protocols of two devices. In many embodiments, during the permission phase, the first device may select one or more devices and, e.g., one or more files to transfer, and transmit a permission request frame to request permission to transfer the one or more files.

The second device or the receiving devices may receive the permission request and respond by transmitting a permission response frame with, e.g., an indication of a permission acceptance or a permission denial. When the second device transmits an acceptance, either the first device or the second device may initiate a peer-to-peer (P2P) connection. For instance, for a one device to one device case, i.e., One Sender to One Receiver:

In some embodiments, if Sender and Receiver are in the same P2P group, the existing P2P group can be used for communication. For instance, the Sender and Receiver may use an Intra-Basic Service Set (BSS) Distribution or a Tunneled Direct Link Setup (TDLS) link within P2P group during the P2P connection phase. In some embodiments, if both Sender and Receiver are not in a P2P group, use Group Owner (GO) negotiation to start a new group in the P2P initiation phase. In some embodiments, if either Sender or Receiver is in a P2P group, the device that is in the group sends the P2P Invitation to invite the other device to join the group in the P2P initiation phase.

In some embodiments, during the P2P initiation phase, if the Sender and Receiver are in different P2P groups, the follow rules may be applied:

If the Sender is a GO, the Sender shall send P2P Invitation to invite the other device to join.

Else, if the Group Owner is the Receiver, the Receiver should send a P2P Invitation to invite the Sender to join. For example, this may be the case if the Sender is a Client of another group.

Else, in some embodiments, the Sender may send a P2P Invitation to invite the other device to join. In this case, neither the Sender nor the Receiver is the GO. In alternative embodiments, the Receiver may send the P2P Invitation to invite the Sender to join. In some embodiments, whether the Sender or the Receiver sends the invitation may be based upon policies of the Sender and/or the Receiver. Several embodiments may have a policy negotiation to determine which device should send the invitation.

As a further illustration, for a 1 device to N devices case, e.g., one Sender to multiple Receivers:

In some embodiments, if the Sender and all Receivers are in the same P2P group, the existing P2P group can be used for communication. The Sender and Receivers may use an Intra-Basic Service Set (BSS) Distribution or a direct link within the P2P group. Otherwise, the Sender may start an autonomous P2P Group as a GO, and send a P2P Invitation to all the Receivers to invite them to join the group. The Receivers may choose to accept or reject the invitation.

In several embodiments, the data exchanges may include one or more of any number of unicast transmissions, and may include Generic Advertisement Service (GAS), Access Network Query Protocol (ANQP), Association, Robust Security Network Association (RSNA) authentication, etc.

Various embodiments may be designed to address different technical problems associated with P2P connectivity. For instance, some embodiments may be designed to address one or more technical problems such as the interoperability between services and/or applications from multiple vendors. The technical problem of the interoperability between services and/or applications from multiple vendors may involve a lack of a standard procedure to enable multiple vendors' applications and services interoperability.

Different technical problems such as those discussed above may be addressed by one or more different embodiments. For instance, some embodiments that are designed to address the interoperability between services and/or applications from multiple vendors may do so by one or more different technical means such as establishing a procedure to enable P2P connection limited to allow traffic from user-invoked services on a Wireless Fidelity (Wi-Fi) Direct connection. Some embodiments may take advantage of Wi-Fi network ubiquity, enabling new communications among Wi-Fi Direct devices. Wi-Fi generally refers to devices that implement the IEEE 802.11-2007 and other related wireless standards.

Some embodiments implement Institute of Electrical and Electronic Engineers (IEEE) 802.11 systems such as IEEE 802.11 ah systems. The IEEE 802.11 wireless standard defines EDCA (enhanced distributed channel access), which is a prioritized carrier sense multiple access with collision avoidance (CSMA/CA) access mechanism. IEEE 802.11-2007, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2007.pdf).

Several embodiments comprise devices such as routers, switches, servers, workstations, netbooks, mobile devices (Laptop, Smart Phone, Tablet, and the like), as well as sensors, meters, controls, instruments, monitors, appliances, and the like.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. In many embodiments, the network 1005 may represent a logical affiliation of the devices 1010, 1030, 1050, and 1055 to a peer-to-peer (P2P) group. In other embodiments, the devices 1010, 1030, 1050, and 1055 may physically connect to a network infrastructure but have the capabilities of peer-to-peer communications.

The communications device 1010 may communicate wirelessly with a plurality of communication devices 1030, 1050, and 1055 as part of a P2P group. The communications device 1010 may comprise a mobile phone. The communications device 1030 may comprise a low power communications device such as a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed.

Initially, a user of the communications device 1010 may decide to transmit a file such as a digital photograph from communications device 1010 to the communications device 1030. The user may first instruct the communications device 1010 to discover devices that support file transfers. The communications device 1010 may respond by transmitting a device discovery request frame 1014 in, e.g., the form of a probe frame or a beacon frame. In many embodiments, the device discovery request frame 1014 may comprise a source identifier to identify the source of the request and an indication that the communications device 1010 is seeking responses from communications devices that support a type of service such as a file transfer service.

The communications devices 1030, 1050, and 1055 may receive the discovery request frame and determine responses, if any. The communications device 1030 may determine that the communications device 1030 can support a file transfer and may respond with a device discovery response frame 1034 that indicates that the device 1030 can support the service type.

In many embodiments, after discovering one or more communications devices that support a particular service type such as the file transfer, the communications device 1010 may transmit a service query frame to the communications device 1030 to determine one or more protocols that can be implemented to perform the service type such as transferring the file and the communications device 1030 may respond with a Service Response frame to indicate that the communications device 1030 can support the service type with one or more specific file transfer protocols.

The communications device 1050 may also respond with an indication that the communications device 1050 can support the service type with a discovery response frame and can support file transfers with one or more file transfer protocols via a service response frame. Furthermore, the communications device 1055 may determine that the communications device 1055 does not support file transfer protocols. In many embodiments, the communications device 1055 may not respond to the device discovery frame 1014 since the communications device 1055 does not support the appropriate service type. In alternative embodiments, the communications device 1055 may respond with an acknowledgement or may respond with a frame indicating that file transfer is not supported.

In other embodiments, the communications device 1010 may include indications of one or more file transfer protocols in the discovery request frame 1014 and the communications devices 1030 and 1050 may respond with acknowledgement frames to acknowledge that one or more of the file transfer protocols is supported.

The user of the communications device 1010 may receive the responses from the communications devices 1030 and 1050 via a user interface on the communications device 1010 and may select the communications device 1030 for the file transfer. In other embodiments, the user may select both the communications devices 1030 and 1050 to transmit the file to both communications devices.

After the user selects the communications device 1030 to transfer the file, the communications device 1010 may transmit a request for permission to transmit the selected file to the communications device 1030 and the communications device 1030 may determine, based upon, e.g., the file type to be transferred, authentication information from the communications device 1010, an identification of the communications device 1010, and/or information about the user of the communications device 1010, that the communications device 1030 grants permission to the communications device 1010 to transfer the file to the communications device 1030 through a peer-to-peer connection. In other situations, the communications device 1030 may deny or reject the request for permission based upon, e.g., the file type to be transferred, authentication information from device 1010, identification of the device 1010, and/or information about the user of device 1010. In further embodiments, the communications device 1030 may request that the user of the communications device 1030 approve or disapprove the transfer via a user interface. In still other embodiments, the communications device 1030 may receive instructions from the user of the communications device 1030 to request additional information about the communications device 1010, the file, user of the communications device 1010, and/or other information and the communications device 1030 may include a request for such information in a permission response frame.

After the communications device 1030 responds to the communications device 1010 with a permission response frame indicating that the request for permission to transfer the file is granted, either the communications device 1010 or the communications device 1030 may initiate P2P communications with the other communications device. For instance, in some embodiments, if the communications device 1010 and the communications device 1030 are in the same P2P group (e.g., network 1005), the existing P2P group can be used to transfer the file from the communications device 1010 to the communications device 1030. The communications device 1010 and the communications device 1030 may use, e.g., an Intra-Basic Service Set (BSS) Distribution, a Tunneled Direct Link Setup (TDLS) link, or another type of link within P2P group. In some embodiments, if both the communications device 1010 and the communications device 1030 are not in a P2P group, the communications devices 1010 and 1030 may use Group Owner (GO) negotiation to start a new group. In some embodiments, if either the communications device 1010 or the communications device 1030 is in a P2P group, the communications device that is in the group sends the P2P Invitation to invite the other communications device to join the group.

In other situations, the communications device 1010 and the communications device 1030 may be in different P2P groups. In such situations, if the communications device 1010 is a Group Owner (GO) of its P2P group, the communications device 1010 may send a P2P Invitation to invite the communications device 1030 to join the P2P group. If the communications device 1030 is a GO, the communications device 1030 may send a P2P Invitation to invite the communications device 1010 to join. Furthermore, if neither the communications device 1010 nor the communications device 1030 is a GO, the communications device 1010 may send a P2P Invitation to invite the communications device 1030 to join. In alternative embodiments, if neither the communications device 1010 nor the communications device 1030 is a GO, the communications device 1030 may send a P2P Invitation to invite the communications device 1010 to join.

As a further illustration, if the user of the communications device 1010 decides to transmit the file to both the communications device 1030 and the communications device 1050, the communications device 1010 may use an existing P2P group if the communications device 1010, the communications device 1030, and the communications device 1050 are all joined with the same P2P group. Otherwise, the communications device 1010 may start an autonomous P2P group as the GO and may send invitations to both the communications device 1030 and the communications device 1050 to join the P2P group. The communications devices 1030 and 1050 may each accept or reject the invitation to joint the autonomous P2P group.

The network 1005 may be a P2P group or may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples any joined communications devices of the communications devices 1010, 1030, 1050, and 1055.

The communication devices 1010 and 1030 comprise memory 1011 and 1031, and Media Access Control (MAC) sublayer logic 1018 and 1038, respectively. The memory 1011 and 1031 may comprise a storage medium such as Dynamic Random Access Memory (DRAM), read only memory (ROM), buffers, registers, cache, flash memory, hard disk drives, solid-state drives, or the like. The memory 1011 and 1031 may store the frames and/or frame structures, or portions thereof such as a beacon, device discovery request, device discovery response, service query, service response, permission request, and permission response frames such as those illustrated in FIGS. 1A-D to perform actions represented in FIG. 1E and/or FIG. 1F (TABLE 1).

The MAC sublayer logic 1018, 1038 may comprise logic to implement functionality of the MAC sublayer of the data link layer of the communications device 1010, 1030. The MAC sublayer logic 1018, 1038 may generate the frames such as management frames and the physical layer logic 1019, 1039 may generate physical layer protocol data units (PPDUs) based upon the frames. More specifically, the frame builders 1013 and 1033 may generate frames 1014, 1034 and the data unit builders of the physical layer logic 1019, 1039 may encapsulate the frames with preambles to generate PPDUs for transmission via a physical layer device such as the transceivers (RX/TX) 1020 and 1040.

The communications devices 1010, 1030, 1050, and 1055 may each comprise a transceiver such as transceivers 1020 and 1040. Each transceiver 1020, 1040 comprises an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking Guard tones may be inserted between symbols such as the short training field (STF) and long training field (LTF) symbols during transmission to avoid inter-symbol interference (ISI), which might result from multi-path distortion. These guard tones also help the signal conform to a spectral mask. The nulling of the direct component (DC) may be used to simplify direct conversion receiver designs.

In some embodiments, the communications device 1010 optionally comprises a Digital Beam Former (DBF) 1022, as indicated by the dashed lines. The DBF 1022 transforms information signals into signals to be applied to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

FIGS. 1A-D depict embodiments of Device Discovery frames, Service Query and Response frames and Permission Request and Response frames for communications between wireless communication devices. Note that these are frames that may be implemented in some embodiments and that other embodiments may use some, all, or none of these frame formats and/or may use other frame formats.

FIG. 1A depicts an embodiment of a device discovery request/response frame 1060 for communications between wireless communication devices such as communications devices 1010, 1030, 1050, and 1055 in FIG. 1. The device discovery request/response frame 1060 may be used to as a discovery request frame and, in some embodiments, as a discovery response frame. In other embodiments, the discovery response frame may differ. For instance, the discovery response frame may be an acknowledgement frame or the like that acts as an affirmative response to the discovery request frame with regard to the indicated service type. In further embodiments, the discovery response frame may include a list of service types that are supported by the device. In further embodiments, the discovery response frame may include a list of service types that were included in the discovery request frame that are supported by the responding communications device.

The device discovery request/response frame 1060 may comprise a header 1061, a frame body, and a frame check sequence (FCS) field 1076. The MAC header 1061 may comprise the frame control field 1062 and other header fields 1068. The frame control field 1062 may be two octets and may identify the type and subtype of the device discovery request frame 1060. The other header fields 1068 may comprise, for example, one or more address fields, identification fields, control fields, or the like. In many embodiments, the number of octets may differ. The frame body may comprise a service type field 1070 that identifies the type of service that the device intends to perform such as a file transfer service. In further embodiments, the service type field 1070 may identify more than one service types. The other fields 1074 may comprise other information. In one embodiment, the other fields may comprise indications of one or more protocols associated with the service type 1070 that the device 1010 supports. In other embodiments, specific protocols of the service type may be included in one or more fields of a service query frame and/or a service response frame.

FIG. 1B depicts an embodiment of a service query frame 1200. The service query frame 1200 may be used to identify service protocols that may be available to perform a service type. In some embodiments, the communications device that initiates the service query may include protocol information such as a list of protocols that the communications device has available to perform the service type. In other embodiments, the communications device that transmits the service query may not include protocol information but may request the protocol information from other communications devices and may select a protocol received in response for performing the service type.

The service query frame 1200 may comprise a header 1201, a frame body, and a frame check sequence (FCS) field 1216. The MAC header 1201 may comprise the frame control field 1202 and other header fields 1204. The frame control field 1202 may be two octets and may identify the type and subtype of the service query frame 1200. The other header fields 1208 may comprise, for example, one or more address fields, identification fields, control fields, or the like. The frame body may comprise a protocol information field 1200 in some embodiments and may not comprise such a field in other embodiments.

FIG. 1C depicts an embodiment of a service response frame 1300. The service response frame 1300 may be used to identify, and in some embodiments, negotiate service protocols that may be available to perform a service type. For instance, a communications device that responds to a service query frame may negotiate for the lowest power consumption protocol by selecting the lowest power consumption protocol from a list of protocols provided in the service query frame, if any, or by including a list of protocols in an order based upon power consumption.

The service response frame 1300 may comprise a header 1301, a frame body, and a frame check sequence (FCS) field 1316. The MAC header 1201 may comprise the frame control field 1302 and other header fields 1304. The frame control field 1302 may be two octets and may identify the type and subtype of the service response frame 1300. The other header fields 1208 may comprise, for example, one or more address fields, identification fields, control fields, or the like. The frame body may comprise a protocol information field 1200 that indicates one or more protocols that are available for performing the service type. In some embodiments, protocols for more than one service type may be requested in the service query frame so the service response frame may comprise one or more protocols for each of the service types.

FIG. 1D depicts an embodiment of a permission request/response frame 1400. The permission request/response frame 1400 may be used for permission requests in some embodiments and may be used for permission responses in some embodiments. The permission request/response frame 1400 may comprise a header 1401, a frame body, and a frame check sequence (FCS) field 1416. The MAC header 1401 may comprise the frame control field 1402 and other header fields 1404. The frame control field 1402 may be two octets and may identify the type and subtype of the permission request/response frame 1400. The other header fields 1068 may comprise, for example, one or more address fields, identification fields, control fields, or the like. The frame body may comprise a metafile 1410, e.g. for file transfer, contents 1412 of a DLNA protocol, a printing protocol, an application enabler, and a port number 1413 for port number negotiation for secure session setup.

Figure 1E:
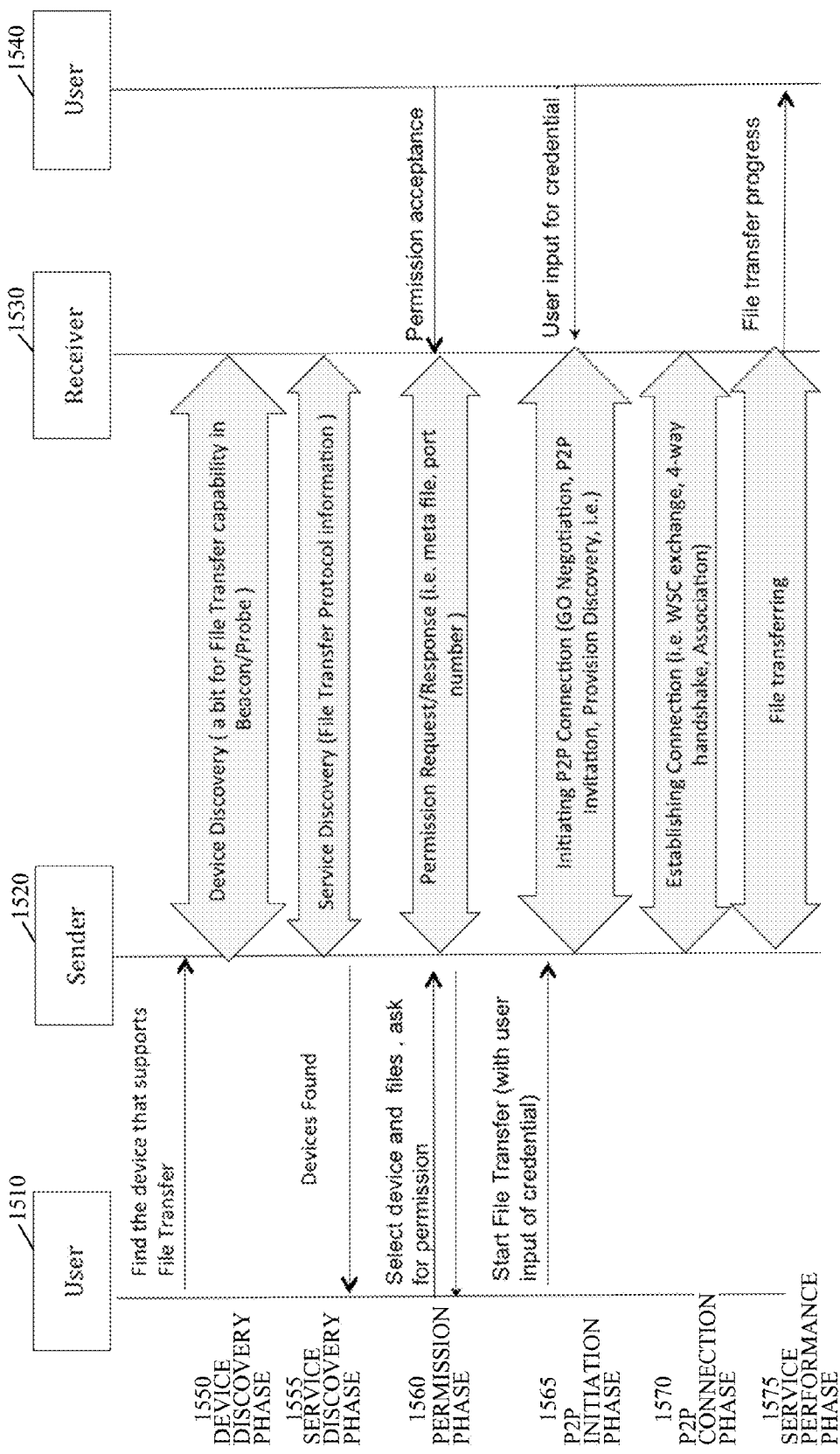
FIG. 1E depicts an embodiment of phases of communications between wireless communication devices to establish an application session based secure peer-to-peer (P2P) link.

FIG. 1E depicts an embodiment of an interaction between a User 1510 and a Sender 1520 for requesting and implementing a file transfer, between the Sender 1520 and a Receiver 1530 to accomplish the file transfer, and between the Receiver 1530 and a User 1540 to grant permission for the file transfer. Note that the sender 1520 and receiver 1530 may represent communications devices such as communications devices 1010, 1030, 1050, and 1055 in FIG. 1. The users 1510 and 1540 may represent actual persons that are using the sender 1520 and receiver 1530, and/or may represent logic such as software or hardware integrated with or coupled with the sender 1520 and receiver 1530. Also note that while this embodiment describes a service type of a file transfer, any other service type may be supported in a similar manner such as file retrieval, application execution services, application disablement services, synchronization services, remote control/operation services, messaging services, and other services.

The present embodiment describes in an order that may be different from the order in other embodiments, wherein the upper most action at the device discovery phase 1550, i.e., of finding devices that support file transfer, occurs first and progresses to the last action in the service performance phase 1575 of reporting the file transfer progress to the user 1540. Furthermore, the actions between the user 1510 and the sender 1520 may comprise a user interface of the sender 1520. The actions between the sender 1520 and the receiver 1530 may represent wireless communication. And the actions between the receiver 1530 and the user 1540 may comprise a user interface of the receiver 1530.

After the user 1510 requests that the sender 1520 find a device that supports file transfer during the device discovery phase 1550, the sender 1520 may transmit a discovery request frame indicating a file transfer service type to the receiver 1530 and the receiver 1530 may respond with a discovery response frame indicating the capability to support file transfer.

During the service discovery phase 1555, after the receiver 1530 responds to the sender 1520 with the discovery response frame, the sender 1520 may transmit a service query frame to the receiver 1530 to determine protocols that are supported by the receiver 1530. The receiver 1530 may respond with a service response frame indicating supported protocols and the sender 150 may report to the user 1510 that the receiver 1530 is a device that has been found that can support the service type of file transfer.

During the permission phase 1560, the user 1510 may select the receiver 1530 and files to transfer to the receiver 1530 and initiate a request for permission to transfer the files to the receiver 1530 via the user interface of the sender 1520. The sender 1520 may, in response, transmit a permission request frame to the receiver 1530. The receiver 1530 may request that the user 1540 grant or deny the request for permission to make the file transfer and may provide the user 1540 with information about the files to be transferred, the user 1510, the sender 1520, and/or other information. The user 1540 may grant permission for the file transfer via the user interface of the receiver 1530. And the receiver 1530 may respond to the sender 1520 with a permission response frame that indicates that the permission request is granted. The sender 1520 may receive the permission response frame and communicate the grant of permission to the user 1510 via the user interface of the sender 1520.

During the P2P initiation phase 1565, after the user 1510 receives the grant of permission for the file transfer, the user 1510 may initiate a P2P connection by a process such as GO negotiation, P2P invitation, and provision discovery request/response, which includes a request that the user 1540 provide a user input of a credential such as a user personal identification number (PIN) to verify that the user 1540 is authorized to receive the files via the user interface of sender 1520. In response, the sender 1520 may initiate a P2P connection with the receiver 1530 that requests that the user 1540 provide the correct credential.

In response to the user providing the correct credential, during the P2P connection phase 1570, the sender 1520 may establish a P2P connection with the receiver 1530. For instance, the establishment of the P2P connection may comprise a Wi-Fi Simple Configuration (WSC) exchange, a 4-way handshake, and an association.

During the service performance phase 1575, after the P2P connection between the sender 1520 and the receiver 1530 is established, the sender 1520 may begin to transmit the files to the receiver 1530 and the receiver 1530 may inform the user 1540 of the progression of the file transfer via the user interface of the receiver 1530.

FIG. 1F depicts a TABLE 1, which depicts other embodiments of some of the potential scenarios based upon P2P interfaces in a P2P topology to initiate a P2P connection between two or more devices for various types of services such as file transfer services, application execution services, application disablement services, synchronization services, remote control/operation services, messaging services, and other services. The column headers describe the association of the receiver with a P2P group and the row headers indicate the association of the sender with a P2P group. The header "P2P Device" indicates that the device is capable of the P2P connection but not joined with a P2P group. The header "P2P GO" indicates that the device is capable of the P2P connection and is a group owner of a P2P group. And the header "P2P Client" indicates that the device is capable of the P2P connection and is joined with but not a group owner of a P2P group.

In accordance with the present embodiment, if the receiver is a P2P device and the sender is a P2P device, one of the receiver or sender may start a new group and then invite the other device to join. If the receiver is a P2P device and the sender is a P2P GO, the sender may invite the receiver to join the P2P group. And if the receiver is a P2P device and the sender is a P2P Client, the sender may either invite the receiver to join the P2P group or disassociate from the P2P group and start a new P2P group.

In accordance with the present embodiment, if the receiver is a P2P GO and the sender is a P2P device, the receiver may invite the sender to join. If the receiver is a P2P GO and the sender is a P2P GO, the sender or the receiver may invite the other device to join the P2P group. And if the receiver is a P2P GO and the sender is a P2P Client, the receiver may invite the sender to join the P2P group.

In accordance with the present embodiment, if the receiver is a P2P Client and the sender is a P2P device, the receiver may either invite the sender to join the P2P group or disassociate from the P2P group and start a new P2P group. If the receiver is a P2P Client and the sender is a P2P GO, the sender may invite the receiver to join the P2P group. And if the receiver is a P2P Client and the sender is a P2P Client, the receiver or sender may either invite the other device to join their P2P group or disassociate from the P2P group and start a new P2P group.

Figure 2:
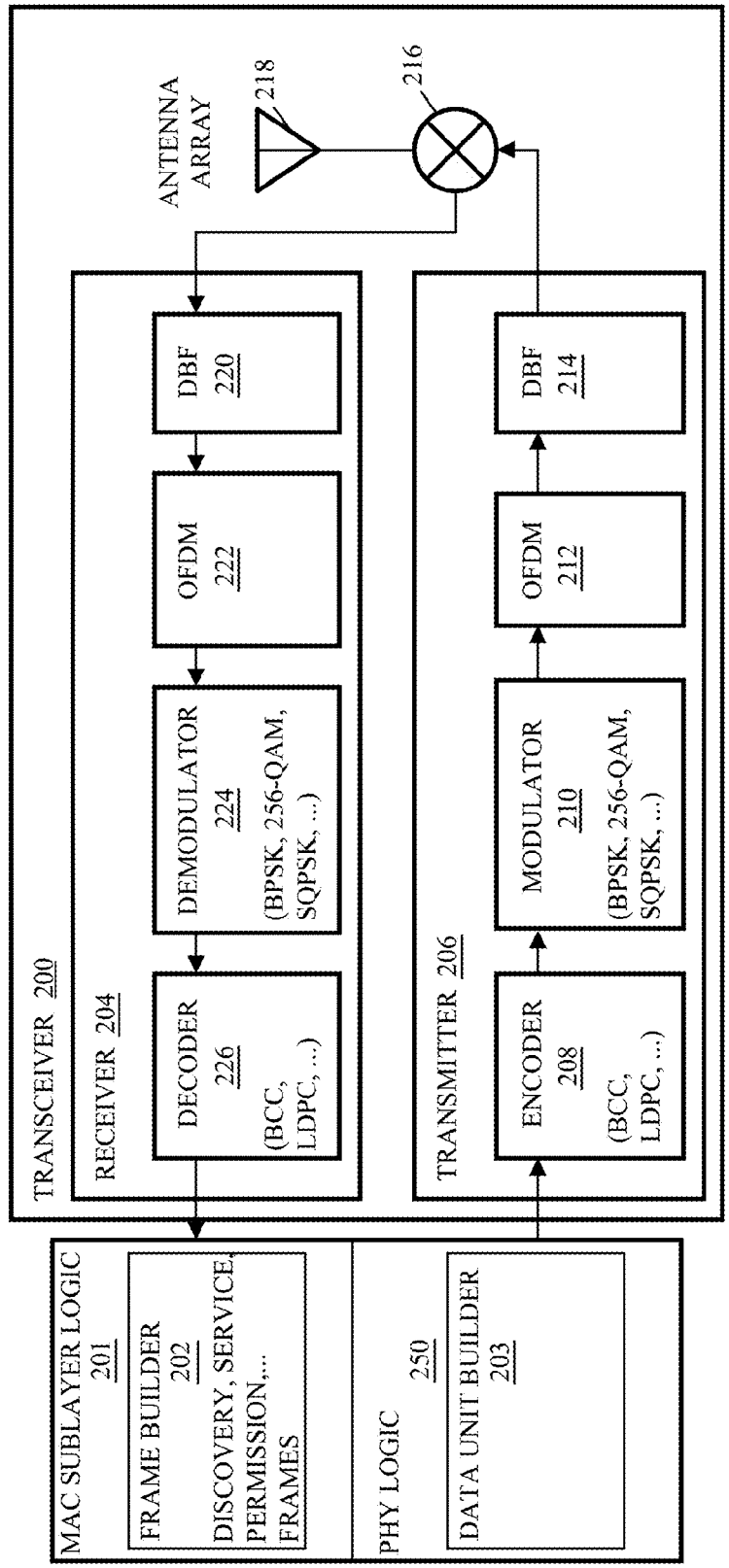
FIG. 2 depicts an embodiment of an apparatus to generate, transmit, receive and interpret frames for communications between wireless communication devices.

FIG. 2 depicts an embodiment of an apparatus to generate, transmit, receive, and interpret frames such as device discovery request/response frames, permission request/response frames, and other P2P related frames. The apparatus comprises a transceiver 200 coupled with Medium Access Control (MAC) sublayer logic 201. The MAC sublayer logic 201 may determine a frame and the physical layer (PHY) logic 250 may determine the PPDU by encapsulating the frame with a preamble to transmit via transceiver 200.

In many embodiments, the MAC sublayer logic 201 may comprise a frame builder 202 to generate frames (MPDUs) such as one of the frames 1060, 1100, 1200, and 1300 illustrated in FIGS. 1A-D.

The PHY logic 250 may comprise a data unit builder 203. The data unit builder 203 may determine a preamble to encapsulate the MPDU to generate a PPDU. In many embodiments, the data unit builder 203 may create the preamble based upon communications parameters chosen through interaction with a destination communications device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid. The output of modulator 210 is fed to an orthogonal frequency division multiplexer (OFDM) 212, which impresses the modulated data from modulator 210 onto a plurality of orthogonal sub-carriers. And, the output of the OFDM 212 may be fed to the digital beam former (DBF) 214 to form a plurality of spatial channels and steer each spatial channel independently to maximize the signal power transmitted to and received from each of a plurality of user terminals.

The transceiver 200 may also comprise diplexers 216 connected to antenna array 218. Thus, in this embodiment, a single antenna array is used for both transmission and reception. When transmitting, the signal passes through diplexers 216 and drives the antenna with the up-converted information-bearing signal. During transmission, the diplexers 216 prevent the signals to be transmitted from entering receiver 204. When receiving, information bearing signals received by the antenna array pass through diplexers 216 to deliver the signal from the antenna array to receiver 204. The diplexers 216 then prevent the received signals from entering transmitter 206. Thus, diplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal.

The transceiver 200 may comprise a receiver 204 for receiving, demodulating, and decoding information bearing signals. The receiver 204 may comprise one or more of a DBF 220, an OFDM 222, a demodulator 224 and a decoder 226. The received signals are fed from antenna elements 218 to a Digital Beam Former (DBF) 220. The DBF 220 transforms N antenna signals into L information signals. The output of the DBF 220 is fed to the OFDM 222. The OFDM 222 extracts signal information from the plurality of sub-carriers onto which information-bearing signals are modulated. The demodulator 224 demodulates the received signal, extracting information content from the received signal to produce an un-demodulated information signal. And, the decoder 226 decodes the received data from the demodulator 224 and transmits the decoded information, the MPDU, to the MAC sublayer logic 201.

Persons of skill in the art will recognize that a transceiver may comprise numerous additional functions not shown in FIG. 2 or many less functions than shown and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing.

The MAC sublayer logic 201 may parse the MPDU to determine the particular type of frame. For instance, the MAC sublayer logic 201 may parse and interpret frames (MPDUs) such as one of the frames 1060, 1100, 1200, and 1300 illustrated in FIGS. 1A-D.

Figure 3:
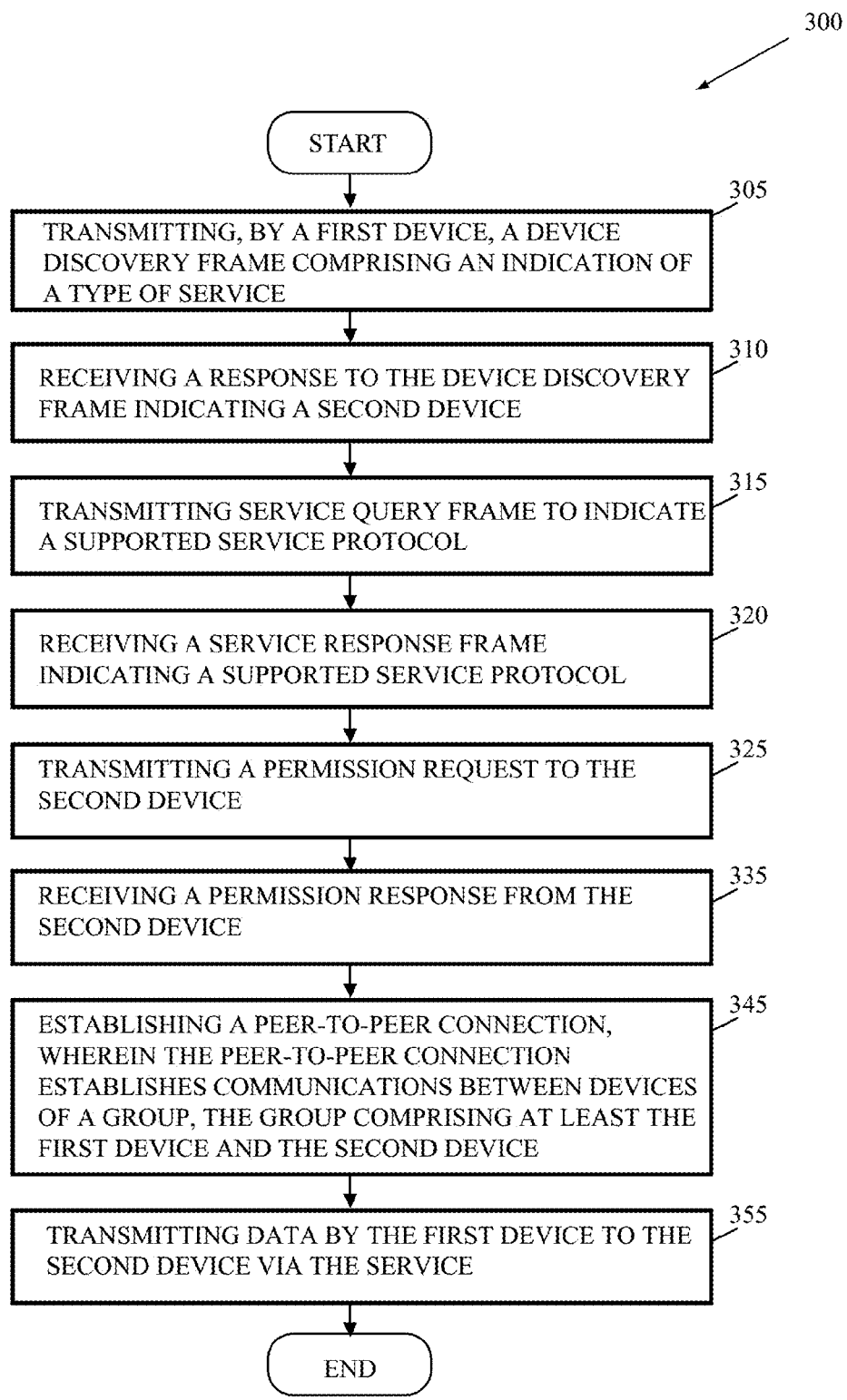
FIG. 3 depicts an embodiment of a flowchart for a new device to establish an application session based secure peer-to-peer (P2P) link.
Figure 4:
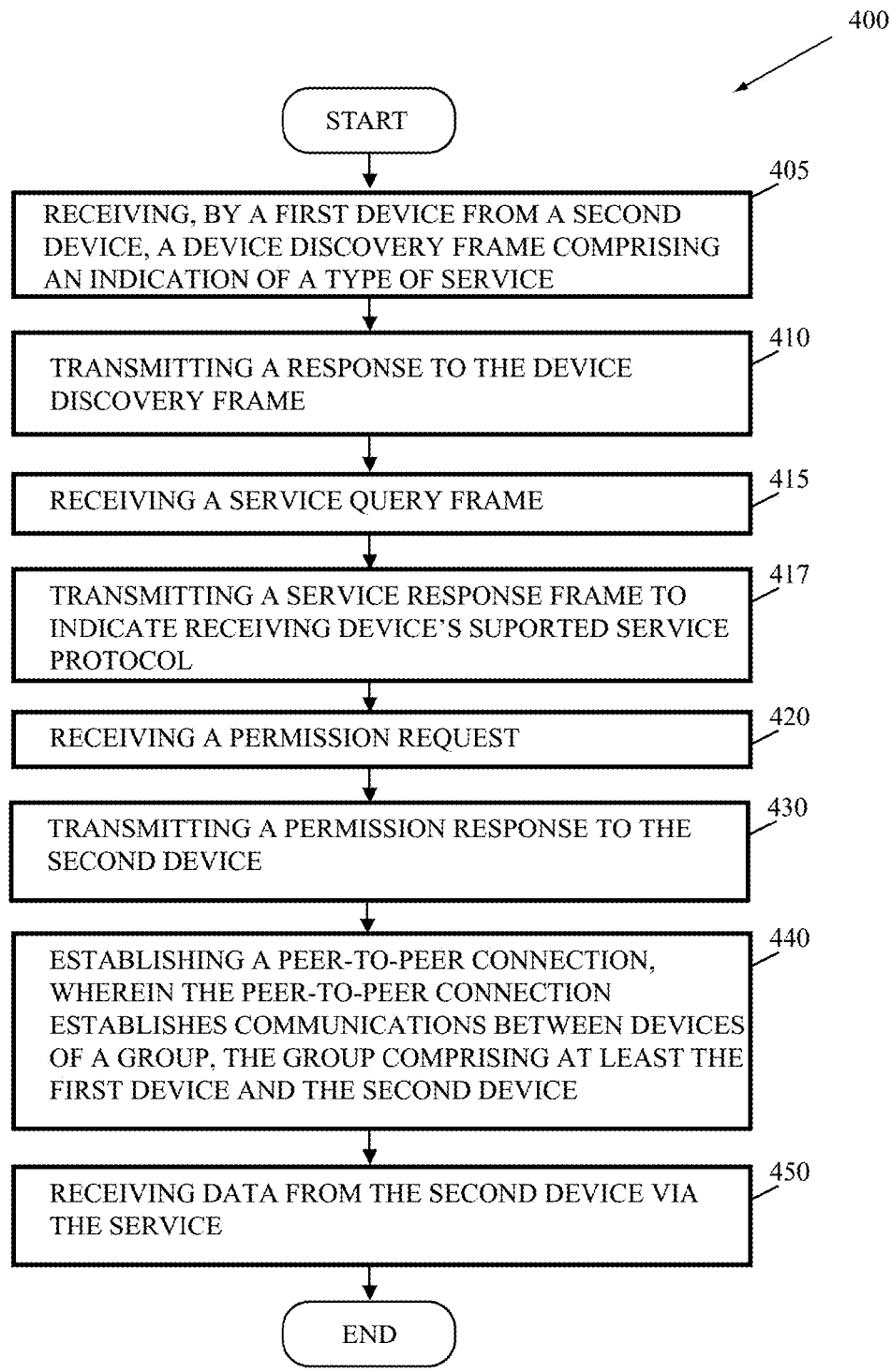
FIG. 4 depicts another embodiment of a flowchart to establish an application session based secure peer-to-peer (P2P) link.

FIGS. 3-4 illustrate embodiments of devices establishing application session based secure peer-to-peer links. FIG. 3 depicts an embodiment of a flowchart 300 for a new device to establish an application session based secure peer-to-peer (P2P) link. The flowchart 300 begins with transmitting, by a first device, a device discovery request frame comprising an indication of a type of service (element 305). In some embodiments, transmitting the device discovery frame comprises transmitting a beacon frame or a probe frame. In further embodiments, transmitting the device discovery frame comprises transmitting a frame comprising data identifying the first device and a service type.

The first device may, in response, receive a response to the device discovery frame indicating a second device (element 310). For instance, the first device may receive an acknowledgement or a discovery response frame from the second device that indicates that the second device can support the service type indicated in the device discovery request frame.

After discovering another device that supports the service type, the first device may transmit a service query comprising an indication of type of service protocols of the first device (element 315). In some embodiments, transmitting the service query comprises transmitting a service query frame. In further embodiments, transmitting the service query frame comprises transmitting a frame comprising data identifying the first device.

In response to the service query, the first device may receive a service response comprising an indication of type of service protocols of the second device (element 320). The first device may, in response, transmit a permission request to the second device (element 325). In some embodiments, transmitting the permission request comprises transmitting a metafile. In some embodiments, transmitting the permission request comprises transmitting content for Digital Living Network Alliance (DLNA) interoperability support. In many embodiments, transmitting the permission request comprises transmitting content for printing and application enablement support. In further embodiments, transmitting the permission request comprises transmitting a port number negotiation for secure session setup to determine the specific port.

After transmitting the permission request, the first device may receive a permission response from the second device (element 335). For instance, the second device may determine that permission is granted based upon information provided to the second device in the permission request frame.

In response to receiving a grant of permission, the first device may establish a peer-to-peer connection, wherein the peer-to-peer connection establishes communications between devices of a group, the group comprising at least the first device and the second device (element 345). In some embodiments, establishing, by the first device with the second device, a peer-to-peer connection comprises initiating an Intra-Basic Service Set (BSS) Distribution link or a Tunneled Direct Link Setup (TDLS) link between the first device and the second device within an existing P2P group to which both the first device and the second device are currently joined. And the first device may transmit data to the second device via the service, and the only traffic data that is related to the service is permitted via a specific port (element 355). In other words, the traffic data that is the only traffic data related to this service type is permitted to transmit via a specific port.

Some embodiments further comprise initiating, by the first device, a peer-to-peer connection. For instance, if the first device and the second device are not currently joined with the same P2P group, the first and the second devices perform actions to be joined with the same P2P group. In some embodiments, initiating, by the first device, a peer-to-peer connection comprises the first device transmitting beacon frames to start a new group. In some embodiments, initiating, by the first device, a peer-to-peer connection comprises initiating a group owner negotiation to start a new group. In many embodiments, initiating, by the first device, a peer-to-peer connection comprises transmitting an invite to the second device to request that the second device join a group, wherein the first device is joined with the group. In several embodiments, initiating a peer-to-peer connection comprises receiving an invite from the second device to request that the first device join a group, wherein the second device is joined with the group. In further embodiments, initiating, by the first device, a peer-to-peer connection comprises initiating an Intra-Basic Service Set (BSS) Distribution link or a Tunneled Direct Link Setup (TDLS) link.

FIG. 4 depicts another embodiment of a flowchart 400 to establish an application session based secure peer-to-peer (P2P) link. The flowchart 400 begins with receiving, by a first device from a second device, a device discovery request frame comprising an indication of a type of service (element 405). In some embodiments, receiving the device discovery frame comprises receiving a beacon frame or a probe frame. In further embodiments, receiving the device discovery frame comprises receiving a frame comprising data identifying the second device.

If the first device supports the service type, the first device may transmit a response to the device discovery request frame (element 410) and then the first device may receive a service query frame comprising an indication of type of service protocols of the first device (element 415). The service query frame may comprise an indication that the second device can support certain protocols or may just be a request to indicate supported protocols. In response, the first device may transmit a service response comprising an indication of type of service protocols of the second device (element 417).

If the first device supports a protocol for the service type that the second device supports, the first device may receive a permission request (element 420). The permission request may comprise a metafile, content for Digital Living Network Alliance (DLNA) interoperability support, content for printing and application enablement support, a port number negotiation for secure session setup to determine a specific port for securely communicating data related to the service, and/or the like.

If the user of the first device grants permission, the first device may transmit a permission response to the second device (element 430) that grants the request for permission. If the user of the first device does not grant permission, the first device may transmit a permission response to the second device (element 430) that denies the request for permission.

Some embodiments may further comprise initiating, by the first device, a peer-to-peer connection. Initiating, by the first device, a peer-to-peer connection may comprise initiating a group owner negotiation to start a new group. In some embodiments, initiating, by the first device, a peer-to-peer connection comprises transmitting an invite to the second device to request that the second device join a group, wherein the first device is joined with the group. In several embodiments, initiating a peer-to-peer connection comprises receiving an invite from the second device to request that the first device join a group, wherein the second device is joined with the group. In further embodiments, initiating, by the first device, a peer-to-peer connection comprises initiating an Intra-Basic Service Set (BSS) Distribution link or a Tunneled Direct Link Setup (TDLS) link.

Thereafter, the first device may establish a peer-to-peer connection, wherein the peer-to-peer connection establishes communications between devices of a group, the group comprising at least the first device and the second device (element 440). And the first device may receive data from the second device via the service (element 450).

The following examples pertain to further embodiments. One example comprises a method. The method may involve transmitting, by a first device, a device discovery request frame comprising an indication of a type of device and service; receiving a response to the device discovery frame indicating a second device; transmitting a service query frame comprising an indication of type of service protocols of the first device; receiving a service response frame comprising an indication of type of service protocols of the second device; transmitting a permission request frame to the second device; receiving a permission response frame from the second device; establishing a peer-to-peer connection, wherein the peer-to-peer connection establishes communications between devices of a group, the group comprising at least the first device and the second device; and transmitting data by the first device to the second device via the service, and the traffic data that is related to the service is permitted via a specific port.

In some embodiments, the method may further comprise initiating, by the first device, a peer-to-peer connection. In some embodiments, initiating, by the first device, a peer-to-peer connection comprises the first device transmitting beacon frames to start a new group. In many embodiments, initiating, by the first device, a peer-to-peer connection comprises initiating an Intra-Basic Service Set (BSS) Distribution link or a Tunneled Direct Link Setup (TDLS) link. In some embodiments, the method may further comprise storing, by the medium access control sublayer logic, at least part of the frame in memory. In several embodiments, transmitting the device discovery request frame comprises transmitting a beacon frame or a probe frame. In further embodiments, transmitting the device discovery request frame comprises transmitting a frame comprising data identifying the first device. And in some embodiments, transmitting the permission request frame comprises transmitting at least a metafile, content for Digital Living Network Alliance (DLNA) interoperability support, content for printing and application enablement support, or a port number negotiation for secure session setup to determine the specific port.

At least one computer program product for communication of a packet with a frame, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise a memory; and a medium access control sublayer logic coupled with the memory to transmit a device discovery request frame comprising an indication of a type of service; receive a response to the device discovery frame indicating a second device; transmit a service query frame to the second device; receive a service response from the second device; transmit a permission request frame to the second device; receive a permission response frame from the second device; establish a peer-to-peer connection, wherein the peer-to-peer connection establishes communications between devices of a group, the group comprising at least the first device and the second device; and transmit data by the first device to the second device via the service.

In some embodiments, the apparatus may further comprise a transmitter coupled with the medium access control logic to transmit the frame. In some embodiments, the apparatus may further comprise an antenna coupled with the transmitter to transmit the frame. In further embodiments of the apparatus, the medium access control sublayer logic comprises logic to initiate a peer-to-peer connection. In some embodiments of the apparatus, the medium access control sublayer logic comprises logic to transmit a frame comprising data identifying the first device and a service type. And in some embodiments of the apparatus, the medium access control sublayer logic comprises logic to transmit at least a metafile, content for Digital Living Network Alliance (DLNA) interoperability support, content for printing and application enablement support, or a port number negotiation for secure session setup to determine a specific port number for communicating data related to the service.

Another example comprises a system. The system may comprise a memory; and a medium access control sublayer logic coupled with the memory to transmit a device discovery request frame comprising an indication of a type of service; receive a response to the device discovery frame indicating a second device; transmit a service query frame to the second device; receive a service response from the second device; transmit a permission request frame to the second device; receive a permission response frame from the second device; establish a peer-to-peer connection, wherein the peer-to-peer connection establishes communications between devices of a group, the group comprising at least the first device and the second device; and transmit data by the first device to the second device via the service; and an antenna coupled with physical layer logic to transmit and receive frames.

Another example comprises a method. The method may involve receiving, by a first device from a second device, a device discovery frame comprising an indication of a type of service; transmitting a response to the device discovery request frame; transmitting a service query frame comprising an indication of type of service protocols of the first device; receiving a service response frame comprising an indication of type of service protocols of the second device; receiving a permission request frame; transmitting a permission response frame to the second device; establishing a peer-to-peer connection, wherein the peer-to-peer connection establishes communications between devices of a group, the group comprising at least the first device and the second device; and receiving data from the second device via the service.

In some embodiments, the method may further comprise initiating, by the first device, a peer-to-peer connection. In some embodiments, initiating, by the first device, a peer-to-peer connection comprises at least initiating a group owner negotiation to start a new group; initiating a group owner negotiation to start a new group; transmitting an invite to the second device to request that the second device join a group, wherein the first device is joined with the group; receiving an invite from the second device to request that the first device join a group, wherein the second device is joined with the group; or initiating an Intra-Basic Service Set (BSS) Distribution link or a Tunneled Direct Link Setup (TDLS) link. In many embodiments, receiving the device discovery request frame comprises receiving a frame comprising data identifying the second device and a service type. In some embodiments, the method may further comprise storing, by the medium access control sublayer logic, at least part of the frame in memory. And in some embodiments, receiving the permission request comprises receiving a port number negotiation for secure session setup to determine a specific port for securely communicating data related to the service.

At least one computer program product for communication of a packet with a frame, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise a memory; and a medium access control sublayer logic coupled with the memory to receive, by the device from a second device, a device discovery request frame comprising an indication of a type of service; transmit a response to the device discovery request frame; receive a service query frame; transmit a response to the service query frame; receive a permission request frame; transmit a response to the permission request frame to the second device; establish a peer-to-peer connection, wherein the peer-to-peer connection establishes communications between devices of a group, the group comprising at least the first device and the second device; and receive data from the second device via the service.

In some embodiments, the apparatus may further comprise a transmitter coupled with the medium access control logic to transmit the frame. In some embodiments, the apparatus may further comprise an antenna coupled with the transmitter to transmit the frame. In further embodiments of the apparatus, the medium access control sublayer logic comprises logic to initiate a peer-to-peer connection. In some embodiments of the apparatus, the medium access control sublayer logic comprises logic to receive the device discovery frame comprises logic to interpret and to respond to the device discovery request frame. And in some embodiments of the apparatus, the medium access control sublayer logic comprises logic to interpret a port number negotiation for secure session setup and to determine a port number based upon the port number negotiation to determine a specific port to be utilized only for data related to the service.

Another example comprises a system. The system may comprise a memory; and a medium access control sublayer logic coupled with the memory to receive, by the device from a second device, a device discovery request frame comprising an indication of a type of service; transmit a response to the device discovery request frame; receive a service query frame; transmit a response to the service query frame; receive a permission request frame; transmit a response to the permission request frame to the second device; establish a peer-to-peer connection, wherein the peer-to-peer connection establishes communications between devices of a group, the group comprising at least the first device and the second device; and receive data from the second device via the service; and an antenna coupled with physical layer logic to transmit and receive frames.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch, e-fuse, or the like. Still further features may be selected by a user after via a selectable preference such as a software preference, an e-fuse, or the like.

Another embodiment is implemented as a program product for implementing systems and methods described with reference to FIGS. 1-4. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

It will be apparent to those skilled in the art having the benefit of this disclosure that the present disclosure contemplates methods and arrangements for establishing application session based secure peer-to-peer links. It is understood that the form of the embodiments shown and described in the detailed description and the drawings are to be taken merely as examples. It is intended that the following claims be interpreted broadly to embrace all variations of the example embodiments disclosed.

What is claimed is:

1. A method comprising:
  after discovering that a second device supports a type of a service with a service protocol, transmitting, by a first device, a permission request frame to the second device, the permission request frame to request permission to establish a peer-to-peer connection to transmit data to the second device via the service;
  receiving a response to the permission request frame from the second device;
  the first device determining a specific port for communicating data related to the service by port number negotiation with the second device;
  in response to receiving a grant of permission to establish the peer-to-peer connection to transmit the data to the second device in the response to the permission request frame from the second device, establishing the peer-to-peer connection between the first device and the second device, wherein the peer-to-peer connection establishes communications between devices of a group, the group comprising at least the first device and the second device; and
  after establishing the peer-to-peer connection between the first device and the second device in the group, transmitting the data by the first device to the second device via the service, wherein the data that is related to the service is permitted to transmit via the specific port.

2. The method of claim 1, further comprising:
  transmitting, by the first device, a device discovery request frame comprising an indication of a type of device and the type of the service;
  receiving a response to the device discovery request frame indicating the second device;
  transmitting a service query frame comprising an indication of service protocols of the first device associated with the type of the service; and
  receiving a service response frame comprising an indication service protocols of the second device associated with the type of the service.

3. The method of claim 2, wherein transmitting the device discovery request frame comprises transmitting a beacon frame or a probe frame.

4. The method of claim 2, wherein transmitting the device discovery request frame comprises transmitting a frame comprising data identifying the first device.

5. The method of claim 1, further comprising initiating, by the first device, a peer-to-peer connection comprising the first device transmitting beacon frames to start a new group; initiating a group owner negotiation to start a new group; transmitting an invite to the second device to request that the second device join a group, wherein the first device is joined with the group; or receiving an invite from the second device to request that the first device join a group, wherein the second device is joined with the group.

6. The method of claim 1, further comprising initiating, by the first device, a peer-to-peer connection comprising initiating an Intra-Basic Service Set (BSS) Distribution link or a Tunneled Direct Link Setup (TDLS) link.

7. The method of claim 1, further comprising storing, by the medium access control sublayer logic, at least part of the frame in memory.

8. The method of claim 1, wherein transmitting the permission request frame comprises transmitting at least a metafile, content for Digital Living Network Alliance (DLNA) interoperability support, content for printing and application enablement support, or a port number negotiation for secure session setup to determine the specific port.

9. A device comprising:
  a memory; and
  a medium access control logic coupled with the memory to, after discovering that a second device supports a type of a service with a service protocol, transmit a permission request frame to the second device, the permission request frame to request permission to establish a peer-to-peer connection to transmit data to the second device via the service; receive a response to the permission request frame from the second device; the device to determine a specific port for communicating data related to the service by port number negotiation with the second device; in response to receiving a grant of permission to establish the peer-to-peer connection to transmit the data to the second device, establish the peer-to-peer connection between the device and the second device, wherein the peer-to-peer connection establishes communications between devices of a group, the group comprising at least the device and the second device; and, after establishing the peer-to-peer connection between the device and the second device in the group, transmit the data by the device to the second device via the service, wherein the data that is related to the service is permitted to transmit via the specific port.

10. The device of claim 9, further comprising a transmitter coupled with the medium access control logic to transmit the frame and an antenna coupled with the transmitter to transmit the frame.

11. The device of claim 10, further comprising logic to transmit a device discovery request frame comprising an indication of the type of the service; receive a response to the device discovery frame indicating the second device; transmit a service query frame to the second device; and receive a service response from the second device.

12. The device of claim 9, wherein the medium access control logic comprises logic to initiate a peer-to-peer connection.

13. The device of claim 9, wherein the medium access control logic to transmit the device discovery request frame comprises logic to transmit a frame comprising data identifying the device.

14. The device of claim 9, wherein the medium access control logic to transmit the permission request frame comprises logic to transmit at least a metafile, content for Digital Living Network Alliance (DLNA) interoperability support, content for printing and application enablement support, or a port number negotiation for secure session setup to determine the specific port number for communicating data related to the service.

15. A method comprising:
    after indicating, by a first device, support of a type of a service with a service protocol to a second device, receiving a permission request frame from the second device, the permission request frame to request permission to establish a peer-to-peer connection to transmit data to the first device via the service;
    transmitting, by the first device, a permission response frame to the second device, the permission response frame to grant permission to establish a peer-to-peer connection to transmit data from the second device to the first device via the service;
    the first device determining a specific port for communicating data related to the service by port number negotiation with the second device;
    in response to transmitting a grant of permission to establish the peer-to-peer connection to transmit the data to the second device from the first device, establishing the peer-to-peer connection between the first device and the second device, wherein the peer-to-peer connection establishes communications between devices of a group, the group comprising at least the first device and the second device; and
    after establishing the peer-to-peer connection between the first device and the second device in the group, receiving the data from the second device via the service, wherein the data that is related to the service is permitted to transmit via the specific port.

16. The method of claim 15, further comprising:
    receiving, by the first device from a second device, a device discovery frame comprising an indication of a type of the service;
    transmitting a response to the device discovery request frame;
    transmitting a service query frame comprising an indication of service protocols of the first device associated with the type of the service; and
    receiving a service response frame comprising an indication of service protocols of the second device associated with the type of the service.

17. The method of claim 16, wherein initiating, by the first device, a peer-to-peer connection comprises at least initiating a group owner negotiation to start a new group; initiating a group owner negotiation to start a new group; transmitting an invite to the second device to request that the second device join a group, wherein the first device is joined with the group; receiving an invite from the second device to request that the first device join a group, wherein the second device is joined with the group; or initiating an Intra-Basic Service Set (BSS) Distribution link or a Tunneled Direct Link Setup (TDLS) link.

18. The method of claim 15, wherein receiving the device discovery request frame comprises receiving a frame comprising data identifying the second device.

19. The method of claim 15, wherein receiving the permission request comprises receiving a port number negotiation for secure session setup to determine the specific port for securely communicating data related to the service.

20. A device comprising:
    a memory; and
    a medium access control logic coupled with the memory to after indicating, by the device, support of a type of a service with a service protocol to a second device, receive a permission request frame from the second device, the permission request frame to request permission to establish a peer-to-peer connection to transmit data to the device via the service; transmit a response to the permission request frame to the second device, the response to the permission request frame to grant permission to establish a peer-to-peer connection to transmit data from the second device to the device via the service; the device determining a specific port for communicating data related to the service by port number negotiation with the second device; in response to transmitting a grant of permission to establish the peer-to-peer connection to transmit the data to the second device from the device, establish the peer-to-peer connection between the device and the second device, wherein the peer-to-peer connection establishes communications between devices of a group, the group comprising at least the device and the second device; and after establishing the peer-to-peer connection between the device and the second device in the group, receive data from the second device via the service, wherein the data that is related to the service is permitted to transmit via the specific port.

21. The device of claim 20, further comprising a transmitter coupled with the medium access control logic to transmit the frame and an antenna coupled with the transmitter to transmit the frame.

22. The device of claim 20, further comprising logic to receive, from a second device, a device discovery request frame comprising an indication of a type of service; transmit a response to the device discovery request frame; receive a service query frame; and transmit a response to the service query frame.

23. The device of claim 20, wherein the medium access control logic comprises logic initiate a peer-to-peer connection.

24. The device of claim 20, wherein the medium access control logic to receive the device discovery frame comprises logic to interpret and to respond to the device discovery request frame.

25. The device of claim 20, wherein the medium access control logic to receive the permission request comprises logic to interpret a port number negotiation for secure session setup and to determine a port number based upon the port number negotiation to determine the specific port to be utilized only for data related to the service.

26. A non-transitory computer readable medium comprising instructions to be executed by a processor-based device, wherein the instructions, when executed by the processor-based device, perform operations, the operations comprising:
    after discovering that a second device supports a type of a service with a service protocol, transmitting, by a first device, a permission request frame to the second device, the permission request frame to request permission to establish a peer-to-peer connection to transmit data to the second device via the service;
    receiving a response to the permission request frame from the second device;
    the first device determining a specific port for communicating data related to the service by port number negotiation with the second device;
    in response to receiving a grant of permission to establish the peer-to-peer connection to transmit the data to the second device, establishing the peer-to-peer connection between the first device and the second device, wherein the peer-to-peer connection establishes communications between devices of a group, the group comprising at least the first device and the second device; and after establishing the peer-to-peer connection between the first device and the second device in the group, transmitting the data by the first device to the second device via the service, wherein the data that is related to the service is permitted to transmit via the specific port.

27. The medium of claim 26, wherein transmitting the permission request comprises transmitting a port number negotiation for secure session setup to determine the specific port for securely communicating data related to the service and only data related to the service.

28. A non-transitory computer readable medium comprising instructions to be executed by a processor-based device, wherein the instructions, when executed by the processor-based device, perform operations, the operations comprising:

after indicating, by a first device, support of a type of a service with a service protocol to a second device, receiving a permission request frame from the second device, the permission request frame to request permission to establish a peer-to-peer connection to transmit data to the first device via the service;

transmitting, by the first device, a permission response frame to the second device, the permission response frame to grant permission to establish a peer-to-peer connection to transmit data from the second device to the first device via the service;

the first device determining a specific port for communicating data related to the service by port number negotiation with the second device;

in response to transmitting a grant of permission to establish the peer-to-peer connection to transmit the data to the second device from the first device, establishing the peer-to-peer connection between the first device and the second device, wherein the peer-to-peer connection establishes communications between devices of a group, the group comprising at least the first device and the second device; and after establishing the peer-to-peer connection between the first device and the second device in the group, receiving the data from the second device via the service, wherein the data that is related to the service is permitted to transmit via the specific port.

29. The medium of claim 28, wherein receiving the permission request comprises receiving a port number negotiation for secure session setup to determine the specific port to be used for traffic data related to the service.

* * * * *